(12) United States Patent
Burke et al.

(10) Patent No.: US 7,043,587 B2
(45) Date of Patent: May 9, 2006

(54) SYSTEM AND METHOD FOR CONNECTING A UNIVERSAL SERIAL BUS DEVICE TO A HOST COMPUTER SYSTEM

(75) Inventors: Thomas Charles Burke, Durham, NC (US); Daryl Carvis Cromer, Cary, NC (US); Richard Alan Dayan, Wake Forest, NC (US); Eric Kern, Durham, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 596 days.

(21) Appl. No.: 09/957,253

(22) Filed: Sep. 20, 2001

(65) Prior Publication Data

US 2003/0056051 A1    Mar. 20, 2003

(51) Int. Cl.
*G06F 13/00*    (2006.01)
(52) U.S. Cl. .................. 710/302; 710/304; 710/260
(58) Field of Classification Search ................ 710/313, 710/100, 260–266, 301–304, 305–306; 713/202
See application file for complete search history.

(56) References Cited

U.S. PATENT DOCUMENTS

| | | |
|---|---|---|
| 5,406,260 A | 4/1995 | Cummings et al. |
| 5,796,984 A | 8/1998 | Pearce et al. |
| 5,821,870 A | 10/1998 | Jackson, Jr. |
| 5,854,891 A | 12/1998 | Postlewaite |
| 5,926,091 A | 7/1999 | Svensson et al. |
| 5,944,840 A | 8/1999 | Lever |
| 6,029,248 A | 2/2000 | Clee et al. |
| 6,064,305 A | 5/2000 | Lockyer |

(Continued)

FOREIGN PATENT DOCUMENTS

EP    0953486 A2    11/1999

(Continued)

OTHER PUBLICATIONS

IBM Corporation, "Method to Identify Multiple identical USB Devices", Research Disclosure; (Feb. 1999), p. 258.

(Continued)

*Primary Examiner*—Rehana Perveen
*Assistant Examiner*—Kim T. Huynh
(74) *Attorney, Agent, or Firm*—Carlos Munoz-Bustamante; Dillon & Yudell LLP

(57) ABSTRACT

A method and system for controlling the addition of a USB device to a host computer system via a hardware hot plug detector that monitors USB ports. The differential signal lines connecting to the USB device are logically OR'ed together, such that logically high D+ or D– signals from the USB device signal a central processing unit's (CPU) system management interrupt (SMI) line to initiate system management mode (SMM). Entering SMM transfers control of the host computer system to an SMI Interrupt Handler BIOS, which resides in the SMM address space of the hose computer system. The SMM BIOS is loaded into the SMM address space during Power On Self Test (POST) and is secured prior to booting the Operating System (OS). The SMM BIOS code contains instructions as to whether or not the connected USB device should be made visible to the operating system of the computer. If the device is not authorized, it is disabled, the D+/D– lines are not connected to the USB host controller, and the SMI signal is cleared, allowing the computer to continue operation without the operating system ever being aware of the USB device.

18 Claims, 3 Drawing Sheets

U.S. PATENT DOCUMENTS

| | | | |
|---|---|---|---|
| 6,098,171 A | 8/2000 | Johnson et al. | |
| 6,104,289 A | 8/2000 | Rand | |
| 6,128,732 A * | 10/2000 | Chaiken | 713/2 |
| 6,131,134 A | 10/2000 | Huang et al. | |
| 6,138,240 A * | 10/2000 | Tran et al. | 713/202 |
| 6,147,603 A | 11/2000 | Rand | |
| 6,172,606 B1 | 1/2001 | Lockyer | |
| 6,205,502 B1 | 3/2001 | Endo et al. | |
| 6,216,183 B1 | 4/2001 | Rawlins | |
| 6,233,640 B1 | 5/2001 | Luke et al. | |
| 6,389,560 B1 * | 5/2002 | Chew | 714/43 |
| 6,393,588 B1 * | 5/2002 | Hsu et al. | 714/43 |
| 6,480,801 B1 * | 11/2002 | Chew | 702/122 |
| 6,505,263 B1 * | 1/2003 | Larson et al. | 710/100 |
| 6,567,875 B1 * | 5/2003 | Williams et al. | 710/302 |
| 6,615,288 B1 * | 9/2003 | Herzi | 710/10 |
| 6,658,515 B1 * | 12/2003 | Larson et al. | 710/260 |
| 6,701,401 B1 * | 3/2004 | Lu et al. | 710/305 |
| 2002/0095501 A1 * | 7/2002 | Chiloyan et al. | 709/227 |
| 2002/0095540 A1 * | 7/2002 | Zolnowsky | 710/305 |
| 2002/0156952 A1 * | 10/2002 | Shono | 710/104 |
| 2002/0166072 A1 * | 11/2002 | Cromer et al. | 713/202 |
| 2003/0005197 A1 * | 1/2003 | Abramson et al. | 710/300 |
| 2003/0041205 A1 * | 2/2003 | Wu et al. | 710/302 |
| 2003/0043771 A1 * | 3/2003 | Mizutani et al. | 370/338 |
| 2004/0162929 A1 * | 8/2004 | Zolnowsky | 710/313 |
| 2005/0076171 A1 * | 4/2005 | Hanson et al. | 710/313 |

FOREIGN PATENT DOCUMENTS

| | | |
|---|---|---|
| EP | 1031931 A2 | 8/2000 |

OTHER PUBLICATIONS

IBM Corporation, "Power Up Security for External Device Bay", Research Disclosure; (Mar. 1999), p. 392.

IBM Corporation, "Remote Detection of Configuration Changes of Hot-Plugable Devices", Research Disclosure; (Mar. 1999), p. 396.

IBM Corporation, "A Means to Reliably Determine the Steady State of a USB Plug-and-Play System", Research Disclosure; (Nov. 1999), p. 1544.

"Universal Serial Bus Specification", Revision 2.0, Chapter 7—Electrical, (Apr. 27, 2000), pp. 119-193.

\* cited by examiner

SYSTEM AND METHOD FOR CONNECTING A UNIVERSAL SERIAL BUS DEVICE TO A HOST COMPUTER SYSTEM

BACKGROUND OF THE INVENTION

1. Technical Field

The present invention relates in general to the field of computers, and in particular, to the interface and connection of computer peripheral devices to a computer system. Still more particularly, the present invention relates to an improved method and system for monitoring and controlling the connection of a Universal Serial Bus (USB) device to the computer system.

2. Description of the Related Art

Computer peripheral input/output (I/O) devices connect to a variety of data ports or external connectors of a host computer system, which includes a system processor and memory. One such port connector interface is the Universal Serial Bus (USB) interface, the specification of which is set forth in the generally available document entitled, "Universal Serial Bus Specification" release 2.0, Apr. 27, 2000 (USB.org), prepared by representatives of Compaq Computer Corporation, Hewlett-Packard Company, Intel Corporation, Lucent Technologies Inc., Microsoft Corporation, NEC Corporation, and Royal Philips Electronics (Philips). Peripheral device interfaces that comply with the specification are referred to as USB interfaces and have been included in many recently developed personal computer systems. Such USB devices are generally referenced as either low-speed devices, capable of transferring data at a rate of 1.5 Megabits per second (Mb/s); or high-speed devices (also called full-speed devices) capable of transferring data at 12 Mb/s. Under the USB 2.0 specification, full-speed devices are capable of using 40× multipliers for a transfer rate of 480 Mb/s, and such USB devices are typically known as true high-speed devices.

Within a personal computer system, a USB interface serves to provide well-known plug-n-play capability for personal computer peripherals such as external Compact Disc-Read Only Memory (CD-ROM) drives, joysticks, magnetic tape and floppy drives, external hard drives, scanners, and printers. Additionally, the USB interface allows an alternate connection for primary system input devices such as keyboards and mice, providing an alternative to the dedicated keyboard and mouse non-USB ports that many personal computer manufacturers provide. The industry generally refers to the non-USB keyboard and mouse ports as the PS/2 keyboard and PS/2 mouse port, respectively.

In a secured environment, control of the system configuration is one of the factors that should be considered. USB ports allow for easy insertion of peripheral devices to and from the computer system. However, this ease of addition of peripheral devices poses security problems. Easy addition of peripheral devices, especially those related to mass storage, can compromise the security of the computer system. By connecting an unauthorized mass data storage system, such as a magnetic floppy disk drive, harmful data such as fraudulent data or computer viruses may be loaded into the computer system. Further, sensitive data, such as proprietary or trade secret data, could be downloaded off the computer system into the unauthorized USB storage device.

In the prior art, connecting USB devices from a host computer system requires the involvement of the operating system of the host computer system. However, software associated with the operating system is typically non-secure, or at least easy to access, thus making it easy for an authorized programmer to modify the software to enable unauthorized USB device connect events.

It should therefore be apparent that there exists a need for a method and system that securely controls the addition of a USB device, and then preferably informs the owner of the computer system of its addition. Such a method and system preferably permit the owner, either manually or automatically through secure software, to allow or prevent an addition of the USB device. Further, it would be desirable to devise a system having the means to implement the USB device connection control method. In addition, it would also be desirable to devise a computer program product for monitoring and controlling an addition of a USB device.

SUMMARY OF THE INVENTION

The present invention relates to a method and system for controlling the addition of a USB device to a host computer system via a hardware hot plug detector that monitors USB ports. The differential signal lines connecting to the USB device are logically OR'ed together, such that logically high D+ or D− signals from the USB device signal a central processing unit's (CPU) system management interrupt (SMI) line to initiate system management mode (SMM). Entering SMM transfers control of the host computer system to an SMI Interrupt Handler BIOS, which resides in the SMM address space of the hose computer system. The SMM BIOS is loaded into the SMM address space during Power On Self Test (POST) and is secured prior to booting the Operating System (OS). The SMM BIOS code contains instructions as to whether or not the connected USB device should be made visible to the operating system of the computer. If the device is not authorized, it is disabled, the D+/D− lines are not connected to the USB host controller, and the SMI signal is cleared, allowing the computer to continue operation without the operating system ever being aware of the USB device.

The above, as well as additional objectives, features, and advantages in the present invention will become apparent in the following detailed written description.

BRIEF DESCRIPTION OF THE DRAWINGS

The novel features believed characteristic of the invention are set forth in the appended claims. The invention itself, however, as well as the preferred mode of use, objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
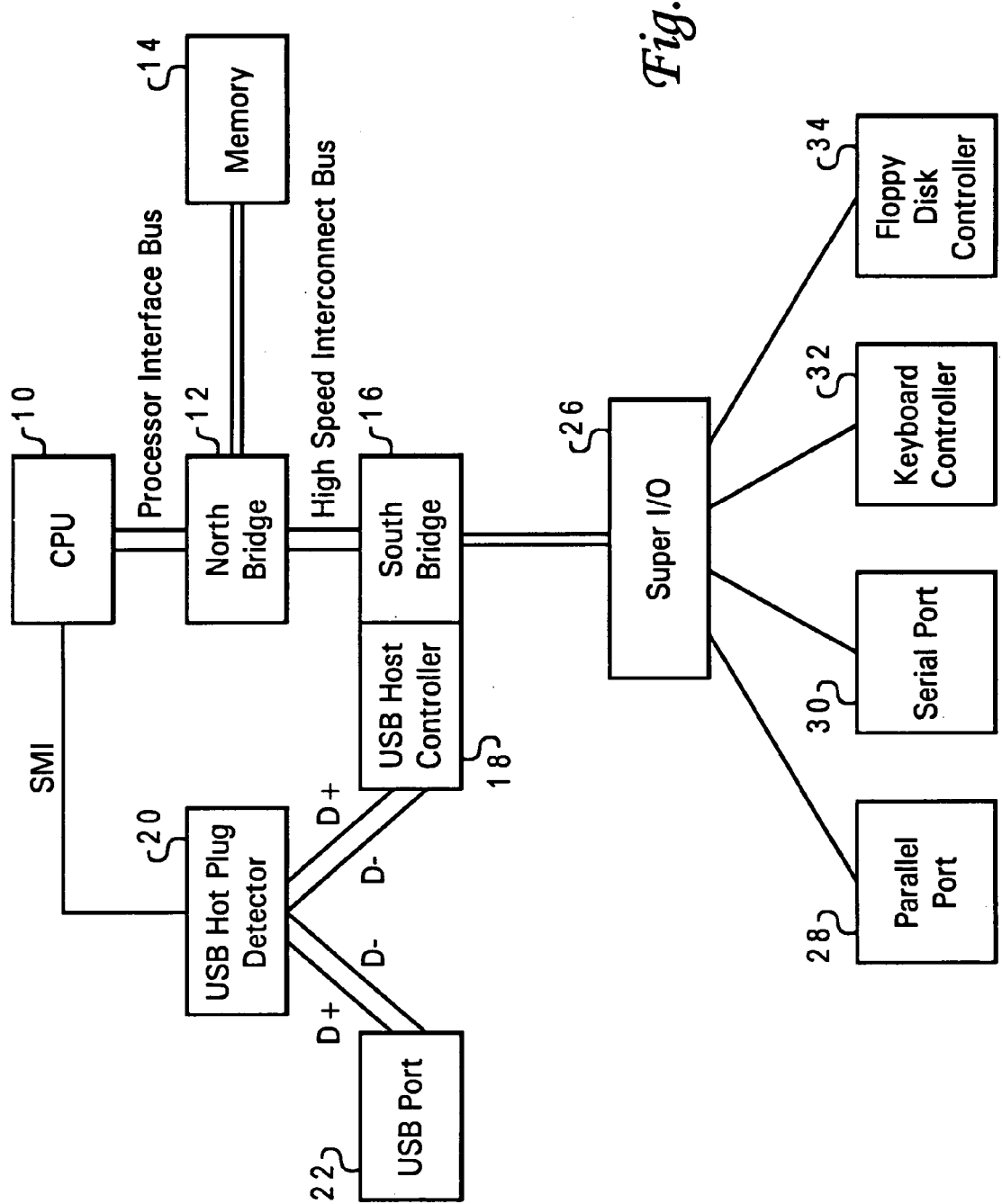
FIG. 1 is a block diagram of a computer architecture utilizing the inventive system for detecting a connect event of a USB device.

With reference now to the drawings and in particular to FIG. 1, there is depicted a high-level block diagram of a computer architecture utilizing a preferred embodiment of the present invention. A central processing unit (CPU) 10 connects via a processor interface bus (also referred to in the art as a front side, host or system bus) to a north bridge 12, a chip or chipset arbiter logic circuit having a memory controller and a high speed interconnect bus source. North bridge 12 includes the necessary interface electronics to strengthen signals from CPU 10, and to separate signals to and from a memory 14 from those going to and from input/output (I/O) devices as described below.

North bridge 12 is connected via a high-speed interconnect bus, preferably a proprietary bus, but alternatively a Peripheral Component Interconnect (PCI) bus, to a south bridge 16, a chip or chipset I/O arbiter that includes the necessary interface logic to convey signals from the high speed interconnect bus to (typically slower) I/O interfaces, including a super I/O 26. Super I/O 26 is typically a chip or chipset including necessary logic and interfaces for a parallel port 28 and a non-USB serial port 30, as are typically known and understood in the art. Super I/O 26 may also include controllers for non-USB devices such as a keyboard controller 32 for a non-USB keyboard and a floppy disk controller 34.

Associated with south bridge 16 is a USB host controller 18. USB host controller 18 includes differential data lines D+ and D−, which attach to USB hot plug detector 20, whose function and structure are further defined below. Differential data lines D+ and D− transmit both data and control signals for a USB device (not shown) according to protocols and standards understood by those skilled in the art of computer interfacing. Data and control signals are transmitted in mirrored positive and negative voltage to permit longer connection wires and to reduce signal noise and degradation. USB hot plug detector 20 is connected to USB port 22 via USB hub 25, preferably via differential lines D+ and D−, to USB host controller 18.

Figure 2:
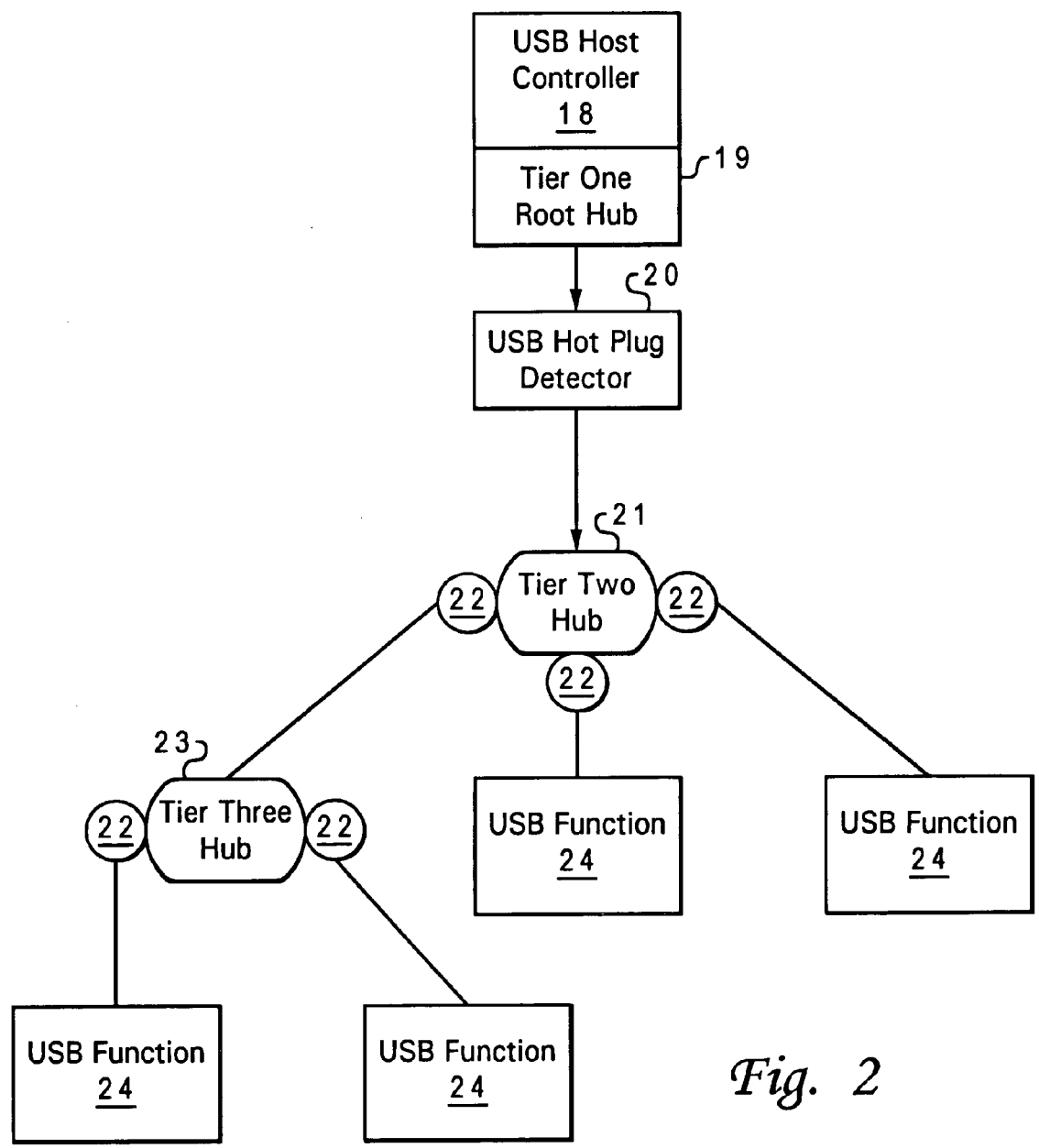
FIG. 2 illustrates in block form additional details of USB topology utilizing the inventive system for detecting USB device connect events.

The USB topology in FIG. 1 is further illustrated in greater detail in FIG. 2. FIG. 2 shows USB host controller 18, which provides an interface to the host computer system including CPU 10 (shown in FIG. 1). USB host controller 18 may be implemented in a combination of hardware, firmware, or software. A tier one root hub 19 is integrated within the host computer system and associated with USB host controller 18 to provide one or more attachment points (USB ports 22) for USB devices, which are either other USB hubs or USB functions. In the preferred embodiment of the invention, tier one root hub 19 connects to USB hot plug detector 20, which attaches to a tier two hub 21. Tier two hub 21 includes multiple USB ports 22. USB ports 22 from tier two hub 21 may connect to another USB hub or to a function 24, which is defined as a USB device that provides a capability to USB host controller 18 and the host computer system. Typical USB functions include a mouse, speaker, microphone, telephone, and mass storage device, such as a floppy disk drive or a compact disk-read only memory (CD-ROM) drive. Tier two hub 21 may also connect to a tier three hub 23, which provides additional USB ports 22 for additional functions 24 or additional hubs (not shown).

Figure 3:
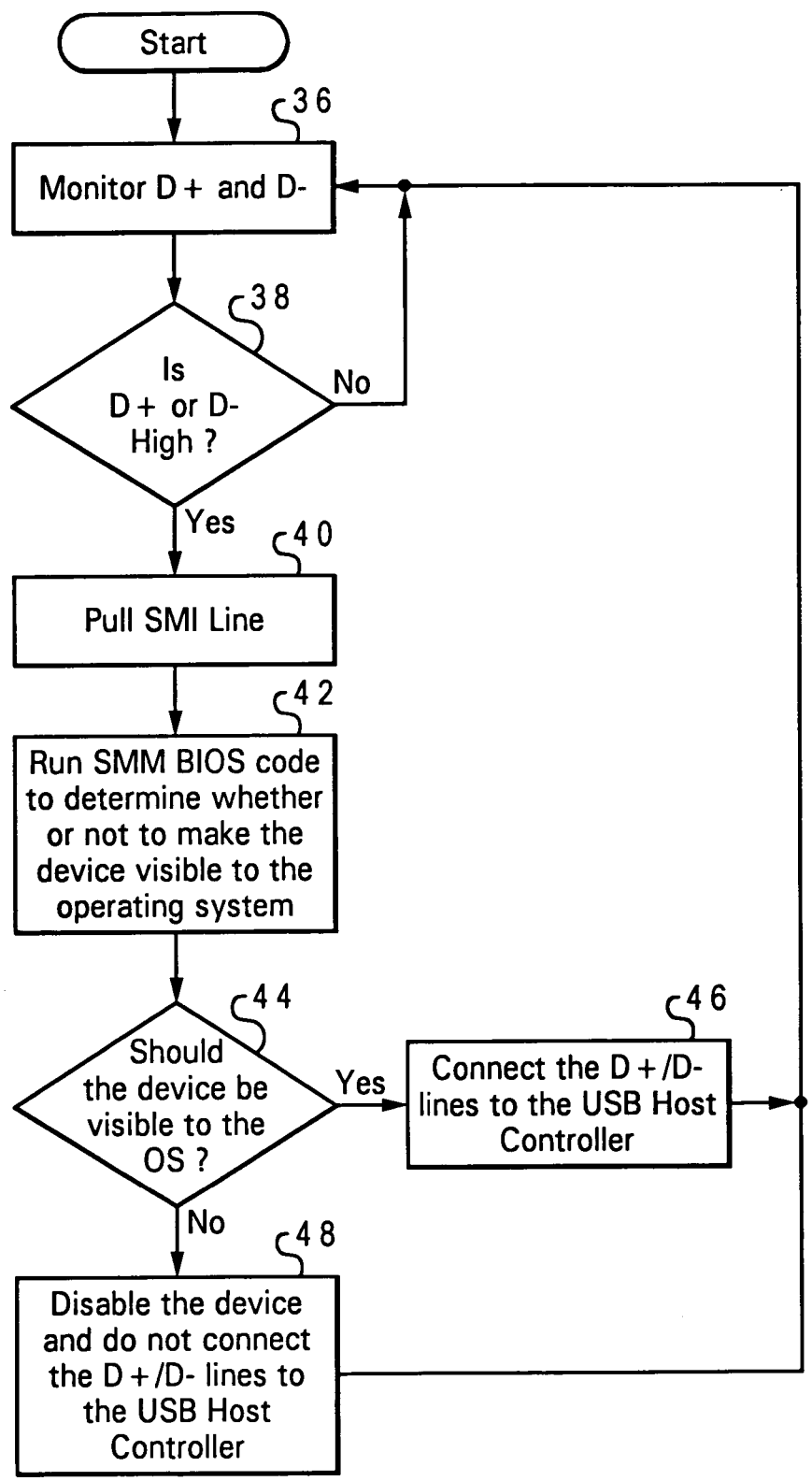
FIG. 3 is a flowchart depicting a USB device connect event utilizing the inventive method and system.

Reference is now made to FIG. 3, a high-level logic flowchart for a USB device connect event. As depicted in block 36, USB hot plug detector 20 monitors the differential data lines D+ and D− from a USB port 22. For simplicity of illustration, it will be assumed that there is only one USB port 22 to be monitored. However, it is understood and appreciated that appropriate logic circuits, as known and understood in the art, may monitor multiple USB ports 22 illustrated in FIG. 2. Referencing again block 36 in FIG. 3, USB hot plug detector functions as a logical OR device. If a USB device function 24 plugs into USB port 22, circuitry within USB function 24 will pull the D+ data line connecting pin high if the device is a high-speed device such as a magnetic floppy disk drive or an optical CD-ROM drive, or the D− data line will be pulled high if the device is a low-speed device, such as a mouse or keyboard. The D+ or D− high signal is transmitted from function 24 to USB port 22 via a standard USB cable. As depicted in decision block 38, if either the D+ or D− line is high, USB hot plug detector 20 generates a system management interrupt (SMI) signal to CPU 10. The SMI causes CPU 10 to place the computer system in a system management mode (SMM). Entering SMM transfers control of the computer system to the SMI Interrupt Handler basic input/output system (BIOS), which resides in the SMM address space of the host computer system. The SMM BIOS is loaded into the SMM address space during Power On Self Test (POST) and is locked prior to booting the Operating System (OS) which is considered as a secure memory location, and preferably may be initiated or updated only by the system owner or administrator of the host computer system. Preferably, only the host computer system owner or administrator has been provided a setup utility to specify to the SMI handler through SMM BIOS code what actions to take when an insertion event is detected. The setup utility can be protected from access without knowledge of the administrator password by switching the system into enhanced security mode and installing an administrator password. As illustrated in block 42, the SMM BIOS code is executed to determine whether or not the USB device that has been connected should be made visible to the operating system of the host computer system. The SMM BIOS code includes code necessary to perform the query illustrated in decision block 44. If the SMM BIOS permits the addition of the recently connected function 24, then USB hot plug detector 20 will permit the connections of the D+/D− lines to USB host controller 18, and the operating system of the host computer system is now made aware of the connected device for the first time, as depicted in block 46. If the recently connected function 24 is not authorized, then the device is disabled by not connecting the D+/D− lines to USB host controller 18, as illustrated in block 48.

In the preferred embodiment, SMM BIOS code is selective as to what type of function 24 may be connected. For example, functions 24 such as monitors, keyboards, and mice may be permitted to be connected, while mass storage devices such as floppy disk drives and CD-ROMs might not be authorized. If the USB device function 24 is authorized to be attached, the host computer system is then connected to the D+/D− lines of the USB device function 24, and enables the USB port 22 and addresses the USB device 24. The host computer system assigns a unique USB address to the USB device 24 and then determines if the newly attached USB device 24 is a hub or function. If the attached USB device is a hub and USB devices are attached to its ports 22, then the above procedure is followed for each of the attached USB devices. If the attached USB device is a function 24, then attachment notifications are handled by host software that is appropriate for the function.

If the device is not authorized to be connected according to the SMM BIOS code, the device is disabled, the D+/D− lines are not connected to USB host controller 18, the SMI interrupt is canceled, and the operating system of the host computer system's operating system never detects the USB device whose connection was attempted, as illustrated in block 48. Following the steps depicted in block 46 (an authorized connection event) or block 48 (termination of an unauthorized connection attempt), USB hot plug detector 20 resumes monitoring the D+ and D− lines for another connection event.

In an alternate preferred embodiment, a connection event by any USB device results in notification to a network server to which the host computer system is connected. The system administrator for the network may then take whatever steps are desired in response to the connection event, including rescinding connection authorization through the network and/or operating system level.

As has been illustrated by the above descriptions, the present invention provides a method and system for monitoring and controlling the connection of USB devices without initial notification of the operating system. Through the use of the intermediary hardware associated with USB hot plug detector 20, and the secure SMM BIOS code described above, connection events of USB devices can be securely monitored without initially notifying the O/S system of the host computer system. Thus, additional security is provided, since the more easily accessible operating system code is not the initial arbiter of authorization for connect events.

While the invention has been particularly shown and described with reference to a preferred embodiment, it will be understood by those skilled in the art that various changes in form and detail may be made therein without departing from the spirit and scope of the invention.

What is claimed is:

1. A host computer system having an apparatus for detecting a connection of a Universal Serial Bus (USB) device to the host computer system, said host computer system comprising:
   a USB host controller; a USB hub having a USB port; and
   a USB hot plug detector connected between the USB hub and the USB host controller, said USB hot plug detector capable of initiating a System Management Interrupt (SMI) signal to a host computer system in response to a detection of a USB device being connected to the USB port, wherein connection events of USB devices are securely monitored without notifying an operating system (OS) of the host computer system before the USB hot plug detector sends the SMI signal to the host computer system.

2. The host computer system of claim 1, further comprising means for allowing an operating system of the host computer system to detect a connected USB device only if the connected USB device is authorized.

3. The host computer system of claim 2, further comprising;
   means for running a software code from a secure memory location to make a determination if the connected USB device is authorized; and
   means for selectively allowing the operating system of the host computer system to detect the connected USB device only if the USB device is authorized.

4. The host computer system of claim 3, wherein the secure memory location is located in a System Management Mode (SMM) address space of the host computer system.

5. A method for selectively connecting a Universal Serial Bus (USB) device to a host computer system, said method comprising:
   connecting a USB hot plug detector between a USB port and a USB host controller of a host computer system;
   detecting at the USB hot plug detector a connection event of a USB device at the USB port;
   determining if the connection event is authorized; and
   selectively notifying an operating system of the host computer system if the connection event is authorized, or disabling the USB device if the connection event is unauthorized, wherein connection events of USB devices are securely monitored without an involvement of an operating system (OS) in the host computer system.

6. The method of claim 5, further comprising:
   signaling a System Management Interrupt (SMI) to a central processing unit (CPU) of the host computer system;
   running a software code from a secure memory location to make the determination if the connection event is authorized; and
   connecting a pair of differential data lines from the USB device to the USB host controller only if the connection event is authorized.

7. The method of claim 6, wherein the secure memory location is located in a System Management Mode (SMM) address space of the host computer system.

8. The host computer system of claim 1, wherein the USB hot plug detector is further capable of logically OR'ing a D− data line and a D+ data line from the USB device, wherein the USB device is refused an active connection to the host computer system if either data line is logically high and if the USB device is not authorized to be connected to the USB port.

9. The host computer system of claim 3, further comprising:
   means for notifying a network server, which is connected to the host computer system, if the USB device is connected to the host computer system, wherein the network server and the host computer system are different computers.

10. The method of claim 5, further comprising:
    logically OR'ing a D− data line and a D+ data line from the USB device with an OR gate, wherein an output of the OR gate is logically high if either or both of the D+ and D− data lines are logically high; and
    prohibiting an active connection between the USB device and the host computer system if either data line is logically high and if the connection event is not authorized.

11. The method of claim 5 further comprising:
    notifying a network server, which is connected to the host computer system, if the USB device is connected to the host computer system, wherein the network server and the host computer system are different computers.

12. The host computer system of claim 1, wherein the USB hot plug detector further comprises means for selectively authorizing a USB device to be coupled to the host computer system according to whether the USB device pulls a D+ line high or a D− line high, wherein pulling the D+ line high indicates that the USB device is a high-speed device, and wherein pulling the D− line high indicates that the USB device is a low-speed device.

13. The host computer system of claim 12, wherein the high-speed device is a mass storage device.

14. The host computer system of claim 12, wherein the low-speed device is a keyboard.

15. The host computer system of claim 12, wherein the USB hot plug detector selectively authorizes a coupling of a USB device according to authorization instructions located in a System Management Mode (SMM) Basic Input/Output System (BIOS) in the host computer system.

16. The method of claim 5, further comprising:
    using the USB hot plug detector to selectively authorize a USB device to be coupled to the host computer system according to whether the USB device pulls a D+ line high or a D− line high, wherein pulling the D+ line high indicates that the USB device is a high-speed device, and wherein pulling the D− line high indicates that the USB device is a low-speed device.

17. The method of claim 16, wherein the high-speed device is a mass storage device.

18. The method of claim 5, wherein the USB hot plug detector selectively authorizes a coupling of a USB device to the host computer system according to instructions located in a System Management Mode (SMM) Basic Input/Output System (BIOS) in the host computer system.

* * * * *